US006971154B2

(12) United States Patent  (10) Patent No.: US 6,971,154 B2
Yoo et al.  (45) Date of Patent: Dec. 6, 2005

(54) HARD DISK BALANCING APPARATUS AND METHOD FOR HARD DISK DRIVE

(75) Inventors: Yong-chul Yoo, Suwon-si (KR); Seong-sik Hwang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 10/704,560

(22) Filed: Nov. 12, 2003

(65) Prior Publication Data

US 2004/0095669 A1    May 20, 2004

(30) Foreign Application Priority Data

Nov. 20, 2002  (KR) ................... 10-2002-0072385

(51) Int. Cl.[7] ............................................. B23P 19/10
(52) U.S. Cl. ..................... 29/603.03; 29/737; 33/644; 73/66; 360/98.08
(58) Field of Search ........................... 29/603.03, 737, 29/759–760; 73/66, 644; 360/98.08

(56) References Cited

U.S. PATENT DOCUMENTS

| | | | | |
|---|---|---|---|---|
| 4,563,824 A | * | 1/1986 | Baun | 33/568 |
| 4,933,927 A | * | 6/1990 | Ross | 720/704 |
| 5,043,973 A | * | 8/1991 | Ocheltree et al. | 720/704 |
| 6,158,112 A | * | 12/2000 | Kim et al. | 29/759 |
| 6,189,371 B1 | * | 2/2001 | Hirano | 73/66 |
| 6,421,199 B1 | * | 7/2002 | McKenzie et al. | 360/77.04 |
| 6,453,541 B1 | * | 9/2002 | Guthrie et al. | 29/603.03 |
| 6,651,311 B1 | * | 11/2003 | Kim et al. | 29/603.03 |
| 6,698,286 B1 | * | 3/2004 | Little et al. | 73/469 |
| 6,771,451 B2 | * | 8/2004 | Morris et al. | 360/75 |
| 6,839,956 B2 | * | 1/2005 | Watanabe et al. | 29/603.03 |
| 6,895,656 B2 | * | 5/2005 | Yoshida | 29/603.03 |
| 2003/0192166 A1 | * | 10/2003 | Kelemen | 29/603.03 |

FOREIGN PATENT DOCUMENTS

JP          9-128882          5/1997

OTHER PUBLICATIONS

Notice of Office Action issued by Korean Patent Office on Nov. 23, 2004 and English translation thereof.

* cited by examiner

*Primary Examiner*—Hezron Williams
*Assistant Examiner*—John Hanley
(74) *Attorney, Agent, or Firm*—Staas & Halsey LLP

(57) ABSTRACT

A hard disk balancing apparatus for a hard disk drive including an eccentricity detection unit to detect an eccentricity amount and an eccentricity position of the hard disk with respect to a rotation axis of a spindle motor for rotating the hard disk as an origin, and a pushing unit to push a circumference of the hard disk in the eccentricity position and to move the hard disk on the rotation axis of the spindle motor according to the eccentricity amount. Here, the eccentricity detection unit includes a detection sensor to detect the rotation axis of the spindle motor, and is placed coaxially with the rotation axis of the spindle motor, and at least three distance sensors that are separated from the detection sensor to be at least farther than a radius of the hard disk and to measure a distance between one point on the outer circumference of the hard disk and themselves.

32 Claims, 9 Drawing Sheets

FIG. 9

HARD DISK BALANCING APPARATUS AND METHOD FOR HARD DISK DRIVE

CROSS-REFERENCE TO RELATED APPLICATIONS

This application claims the priority of Korean Patent Application No. 2002-72385, which was filed Nov. 20, 2002, in the Korean Intellectual Property Office, the disclosure of which is incorporated herein in its entirety by reference.

BACKGROUND OF THE INVENTION

1. Field of the Invention

The present invention relates to a disc balancing apparatus and method for a hard disk drive.

2. Description of the Related Art

In general, a hard disk drive (HDD) is an auxiliary memory device of a computer that rotates a hard disk as a magnetic recording medium, using a spindle motor at a high speed, and simultaneously writes information on a magnetic disk or reads information stored on the magnetic disk by way of a magnetic head.

Figure 1:
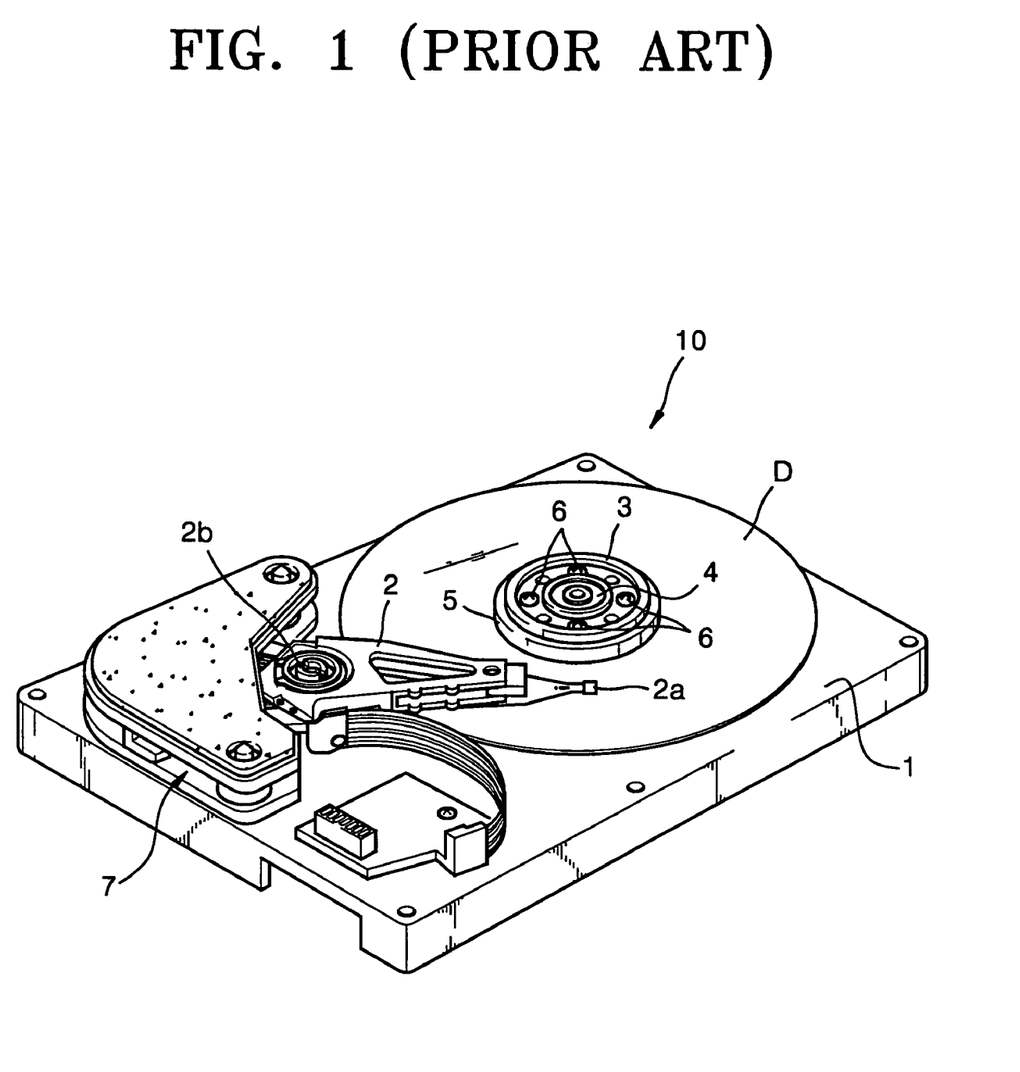
FIG. 1 is a perspective view illustrating an example of a hard disk drive.
Figure 2:
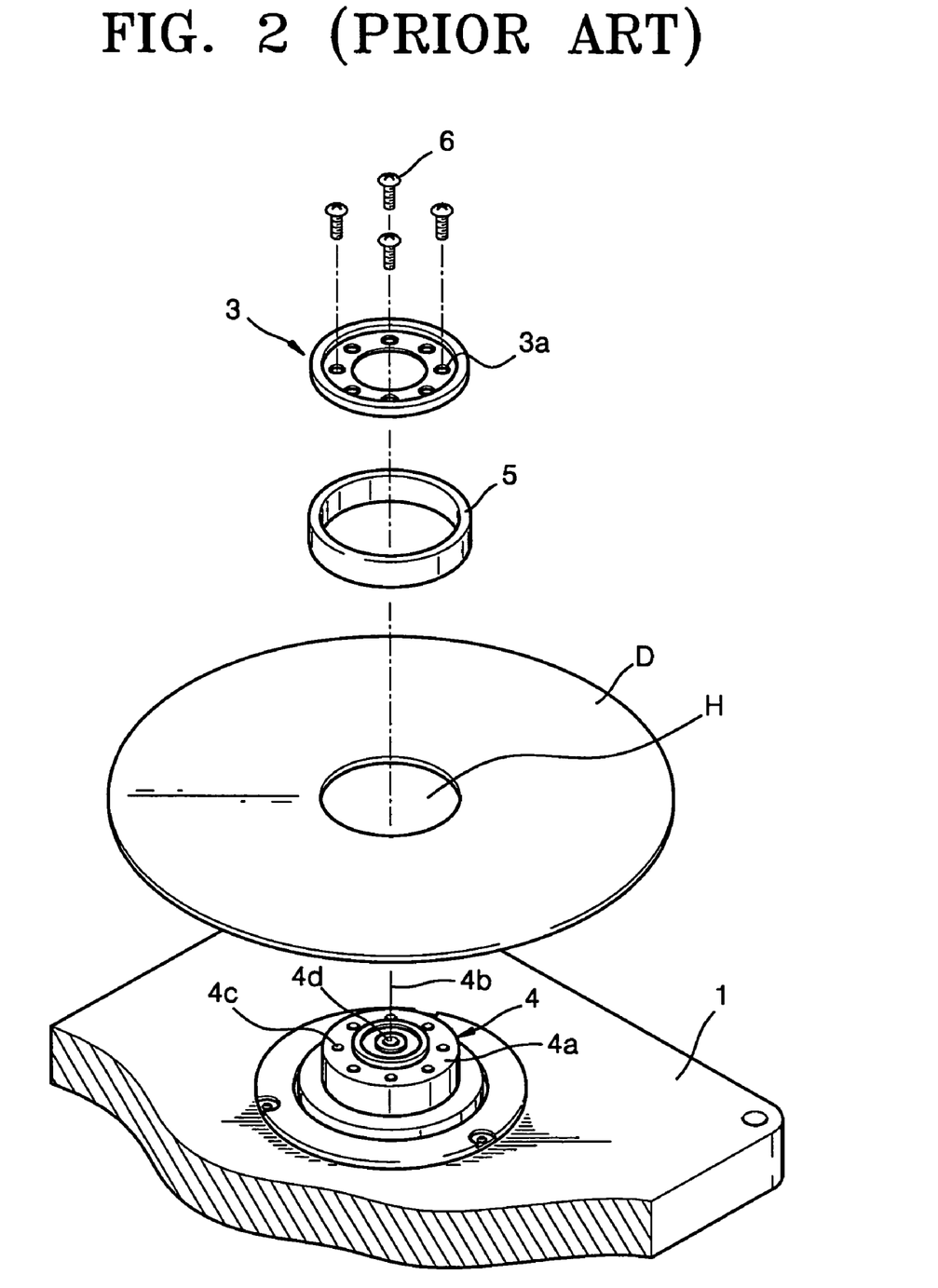
FIG. 2 is a partial exploded perspective view of the hard disk drive shown in FIG. 1.

FIG. 1 is a perspective view illustrating an example of a hard disk drive, and FIG. 2 is a partial exploded perspective view of the hard disk drive shown in FIG. 1.

Referring to FIGS. 1 and 2, a hard disk drive 10 includes a base 1, a spindle motor 4, a hard disk D, and a magnetic head 2a. The spindle motor 4 coupled with the base 1 rotates the hard disk D, and a hub 4a is installed on a rotation shaft 4d. A plurality of screw holes 4c are formed in the hub 4a. The hard disk D is a circular recording medium having a hollow H in the center thereof, which receives the hub 4a. After the hub 4a is accommodated in the hollow H, a spacer 5 is put on the hard disk D, a clamp 3 is put on the spacer 5, and screws 6 are inserted in clamp holes 3a to be attached to the hub 4a via the screw holes 4c, thereby coupling the hard disk D with the spindle motor 4. The magnetic head 2a accesses the hard disk D and reads information from or writes information on the magnetic disk. The magnetic head 2a is coupled with an actuator arm 2 pivoting around a pivot bearing 2b via a voice coil motor 7. Reference numeral 4b denotes a rotation axis of the spindle motor 4.

The hard disk D is rotated at a high speed by the spindle motor 4 and has to be assembled to be exactly concentric with the rotation shaft 4b of the spindle motor 4. However, the diameter of the hollow H receiving the hub 4a is slightly greater than that of the hub 4a. Thus, when the hub 4a is inserted in the hollow H, the hard disk D may be eccentric relative to the median axis of the rotation shaft 4b of the spindle motor 4 as much as half of a diameter difference between the hollow H and the hub 4a. If so, when the hard disk D is rotated at a high speed by the spindle motor 4, vibration may occur, and thus, a tracking error may occur in the magnetic head 2a.

Figure 3:
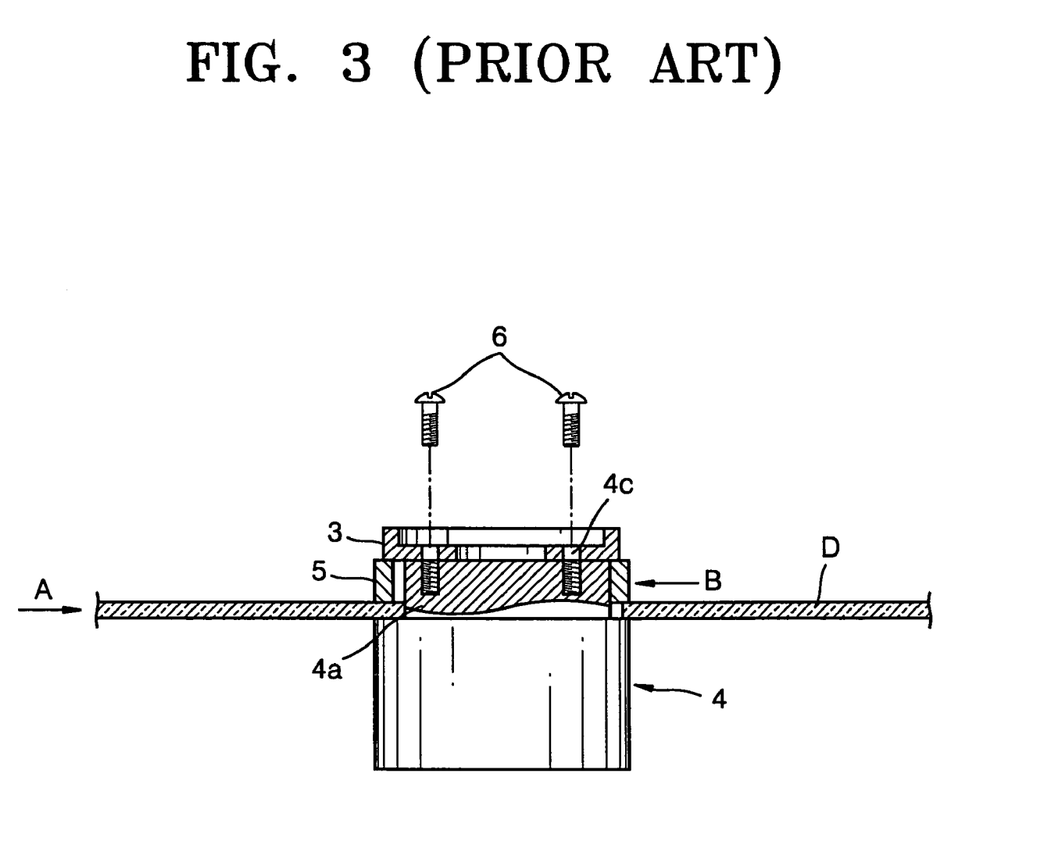
FIG. 3 is a cross-sectional view for illustrating a conventional hard disk balancing method for a hard disk drive.

FIG. 3 is a cross-sectional view for illustrating a conventional hard disk balancing method for a hard disk drive. Referring to FIG. 3, the hub 4a of the spindle motor 4 is inserted in the hollow H of the hard disk D, the spacer 5 is put on the hard disk D, the clamp 3 is put on the spacer 5, and the screws 6 are slightly tightened. Then, the hard disk D is pushed in a direction A, and the spacer 5 is pushed in a direction B, opposite to the direction A. In this state, the screws 6 are completely tightened. Then, the eccentricity of the hard disk D reaches a maximum value in the direction A, while the eccentricity of the spacer 5 reaches a maximum value in the direction B. In this case, the eccentricity of the hard disk D is compensated by the eccentricity of the spacer 5, and thus, even though the hard disk D is rotated at a high speed, vibration of the hard disk D is greatly reduced.

However, the conventional hard disk balancing method for a hard disk drive has the following problems. First, although the vibration that occurs when the hard disk is rotated at the high speed is reduced, because the hard disk is not completely concentric with the rotation shaft of the spindle motor, the tracking error still occurs in the magnetic head. In order to solve this problem, a tracking control of the magnetic head needs to be performed by considering the eccentricity of the hard disk. Second, a diameter difference between the hollow and the hub is not uniform, and a degree of pushing the hard disk and the spacer is not uniform, and thus, the eccentricity amount of the hard disk varies according to the assembly conditions of the hard disk. Thus, it is not easy to perform the tracking control of the magnetic head by considering the eccentricity amount of the hard disk. Third, when a fluid dynamic bearing (FDB) is used as a bearing of the spindle motor, due to the friction between the FDB and the rotation shaft of the spindle motor caused by the eccentricity of the hard disk during an initial driving operation, seizing when the spindle motor does not rotate may occur.

SUMMARY OF THE INVENTION

Accordingly, it is an aspect of the present invention to provide a hard disk balancing apparatus and method for a hard disk drive, in which the center of a hard disk is concentric with a rotation shaft of a spindle motor.

Additional aspects and/or advantages of the present invention will be set forth in part in the description that follows, and, in part, will be obvious from the description, or may be learned by practicing the present invention.

The apparatus comprises an eccentricity detection unit that detects an eccentricity amount and an eccentricity position of the hard disk with respect to a rotation axis of a spindle motor for rotating the hard disk as an origin, and a pushing unit that pushes a circumference of the hard disk in the eccentricity position and moves the hard disk on the rotation axis of the spindle motor according to the eccentricity amount. The eccentricity detection unit comprises a detection sensor which detects the rotation axis of the spindle motor and which is placed coaxial with the rotation axis of the spindle motor, and at least three distance sensors that are separated from the detection sensor to be at least farther than a radius of the hard disk and measure a distance between one point on the outer circumference of the hard disk and themselves.

The apparatus further comprises a limiter that contacts the outer circumference of the hard disk while being separated from the detection sensor by the radius of the hard disk and that prevents the hard disk from being excessively pushed by the pushing unit.

The method comprises (a) detecting coordinates of at least three points on an outer circumference of the hard disk with respect to a rotation axis of a spindle motor for rotating the hard disk as an origin, and calculating a coordinate of a center point of the hard disk, (b) calculating an eccentricity amount and an eccentricity position of the hard disk based on the origin from the coordinate of the center point of the hard disk, and (c) pushing the hard disk toward the origin in the eccentricity position according to the eccentricity amount to remove an eccentricity of the hard disk.

BRIEF DESCRIPTION OF THE DRAWINGS

These and/or other aspects and/or advantages of the present invention will become apparent and more readily appreciated by describing in detail the embodiments thereof with reference to the accompanying drawings in which.

DETAILED DESCRIPTION OF THE PREFERRED EMBODIMENTS

Hereinafter, embodiments of the present invention will be described with reference to the accompanying drawings, wherein like reference numerals refer to like elements throughout.

Figure 4:
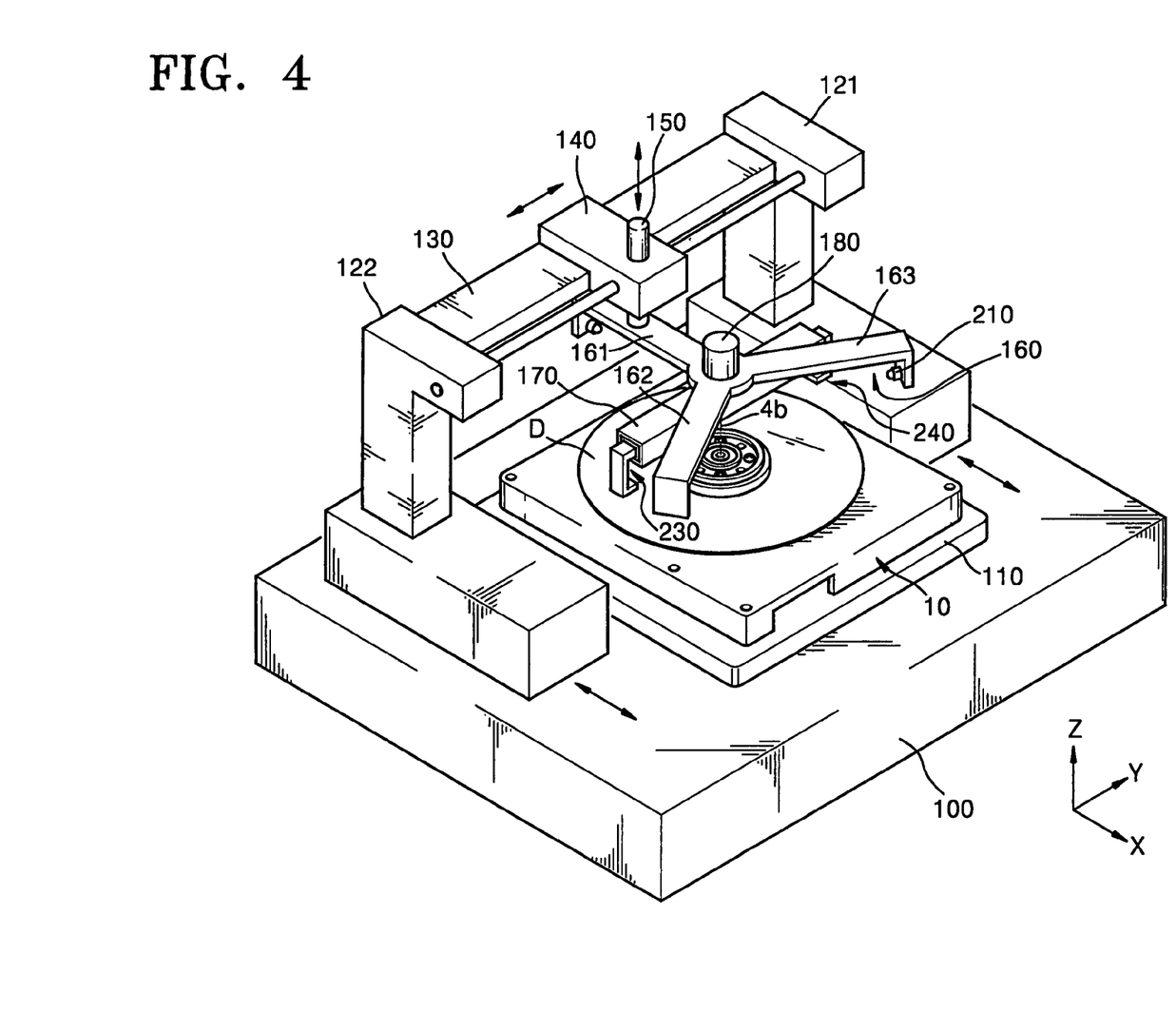
FIG. 4 is a perspective view illustrating a hard disk balancing apparatus for a hard disk drive, according to an embodiment of the present invention.
Figure 5:
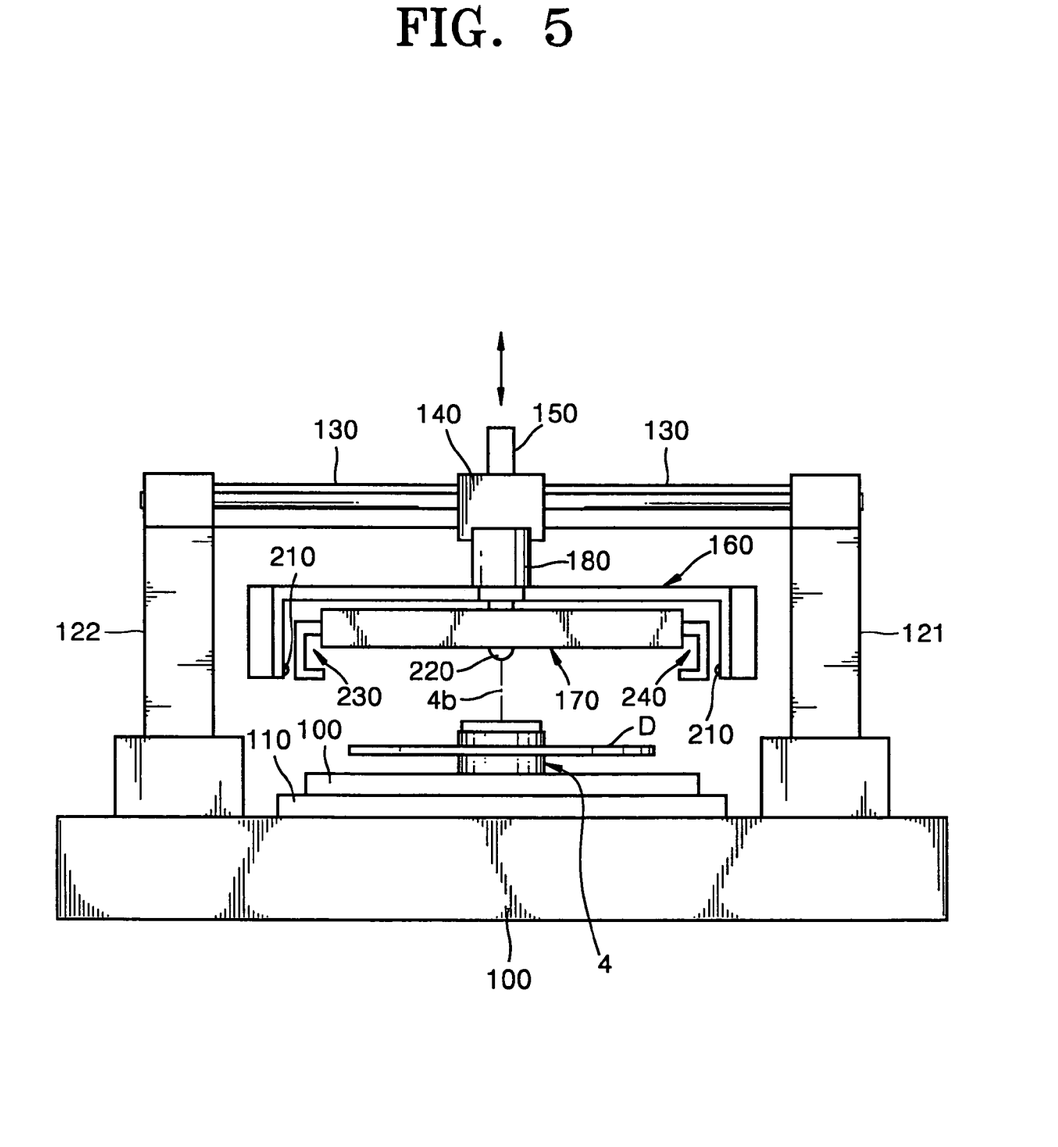
FIG. 5 is a schematic front view of FIG. 4.

FIG. 4 is a perspective view illustrating a hard disk balancing apparatus for a hard disk drive according to a first embodiment of the present invention, and FIG. 5 is a schematic front view of FIG. 4.

Referring to FIGS. 4 and 5, a seating portion 110 is provided on a base frame 100. A hard disk drive 10 is seated on the seating portion 110. In an embodiment, although not shown, a guide structure for guiding the hard disk drive 10 in a predetermined position is provided in the seating portion 110. Also, in an embodiment, a rotation axis 4b of a spindle motor 4 is disposed in a direction Z when the hard disk drive 10 is seated on the seating portion 110. The hard disk drive 10 will be described with reference to FIGS. 1 and 2.

Two columns 121 and 122 are installed on the base frame 100 to be capable of being moved in a direction X. Upper portions of the two columns 121 and 122 are connected to each other by a horizontal frame 130. A slider 140 is installed in the horizontal frame 130 to be capable of being moved in a direction Y. Although not shown, various devices such as a linear motor (not shown) or a lead screw (not shown) may be used as a device for moving the two columns 121 and 122 and the slider 140 in the directions X and Y, respectively.

A vertical frame 150 is installed in the slider 140 in the direction Z. In an embodiment, the vertical frame 150 is installed to be capable of ascending and descending in the direction Z. A first frame 160 is installed at a lower end of the vertical frame 150. Three branches 161, 162, and 163 are formed in the first frame 160. One branch 161 among them is coupled with the lower end of the vertical frame 150. A second frame 170 is coupled with a lower portion of the first frame 160.

The rotation axis 4b of the spindle motor 4 is a base for correcting the eccentricity of a hard disk D. Due to parts errors and assembling errors, the position of the rotation axis 4b may be slightly varied in the hard disk D. Thus, a detection sensor 220 that detects the position of the rotation axis 4b of the spindle motor 4 exactly is provided. In an embodiment, the detection sensor 220 is installed in a lower portion of the second frame 170. An index for indicating the rotation center may be formed in the rotation axis 4b of the spindle motor 4, and by detecting the index, the detection sensor 220 can detect the rotation center of the spindle motor 4 exactly. Alternatively, for example, when a rotation shaft 4d has a circular shape, by detecting the shape of the rotation axis 4b, the rotation center of the spindle motor 4 can be detected. If the detection sensor 220 detects the rotation axis 4b of the spindle motor 4, the columns 121 and 122 and the slider 140 are moved in the directions Y and X, respectively, and the center axis of the detection sensor 220 is coaxial with the rotation axis 4b of the spindle motor 4. Alternatively, although not shown, the seating portion 110 on which the hard disk drive 10 is seated is installed on a horizontal moving apparatus such as an XY table. The XY table is generally well-known, and thus, detailed descriptions thereof will be omitted.

A distance sensor 210 is installed on an end of each of the branches 161, 162, and 163 of the first frame 160. The distance sensor 210 is installed to be slightly separated from an outer circumference of the hard disk D and measures a distance between one point on the outer circumference of the hard disk D and itself. The hard disk D has a circular shape. Thus, in order to obtain a coordinate of the center of the hard disk D, coordinates of at least three points on the outer circumference of the hard disk D need to be known. Thus, at least three of distance sensors 210 are required, and further, more distance sensors 210 may be provided.

It is convenient to calculate the coordinate of the center of the hard disk D with respect to the rotation axis 4b of the spindle motor 4 as an origin. Thus, the distance sensor 210 is installed on a concentric circle centering on the rotation axis 4b of the spindle motor 4, and in an embodiment, is installed at the same distance from the rotation axis 4b of the spindle motor 4. Also, like in the present embodiment, when the three distance sensors 210a, 210b, and 210c are used, the distance sensors 210a, 210b, and 210c are installed at an interval of 120° from each other. As described above, the center axis of the detection sensor 220 is coaxial with the rotation axis 4b of the spindle motor 4. Thus, each of the distance sensors 210a, 210b, and 210c is installed at an interval of 120° from each other and at the same distance from the detection sensor 220.

A pushing unit 230 is installed in the second frame 170. The pushing unit 230 pushes the hard disk D toward the rotation axis 4b of the spindle motor 4 to correct the eccentricity of the hard disk D by considering a calculated eccentricity amount. However, the hard disk D may be excessively pushed, and in order to prevent this, a limiter 240 may be installed. The limiter 240 contacts the outer circumference of the hard disk D while being separated from the rotation axis 4b of the spindle motor 4 by a radius of the hard disk D. In an embodiment, the limiter 240 is installed to face the pushing unit 230. The limiter 240 may be installed in an additional frame (not shown), but in the present embodiment, the limiter 240 is installed in the second frame 170 together with the pushing unit 230. As described above, the limiter 240 may be fixedly installed in the position where the limiter 240 is separated from the rotation axis 4b of the spindle motor 4 by the radius of the hard disk D, that is, in a position where the limiter 240 is separated from the detection sensor 220 by the radius of the hard disk D. Alternatively, the limiter 240 may be installed to be capable of moving in a radial direction of the hard disk D.

Figure 6:
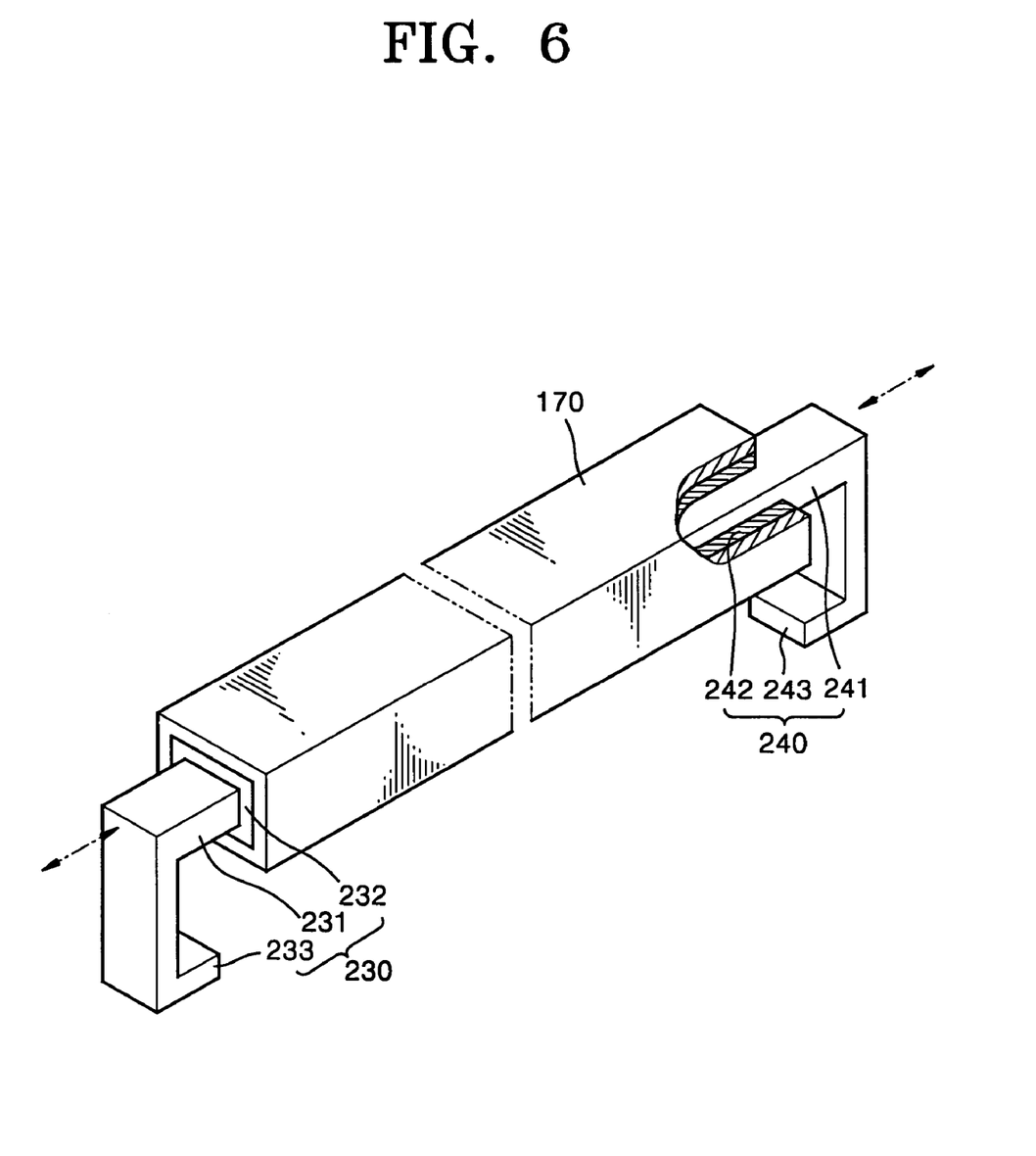
FIG. 6 is a perspective view illustrating a pushing unit and a limiter.
Figure 7:
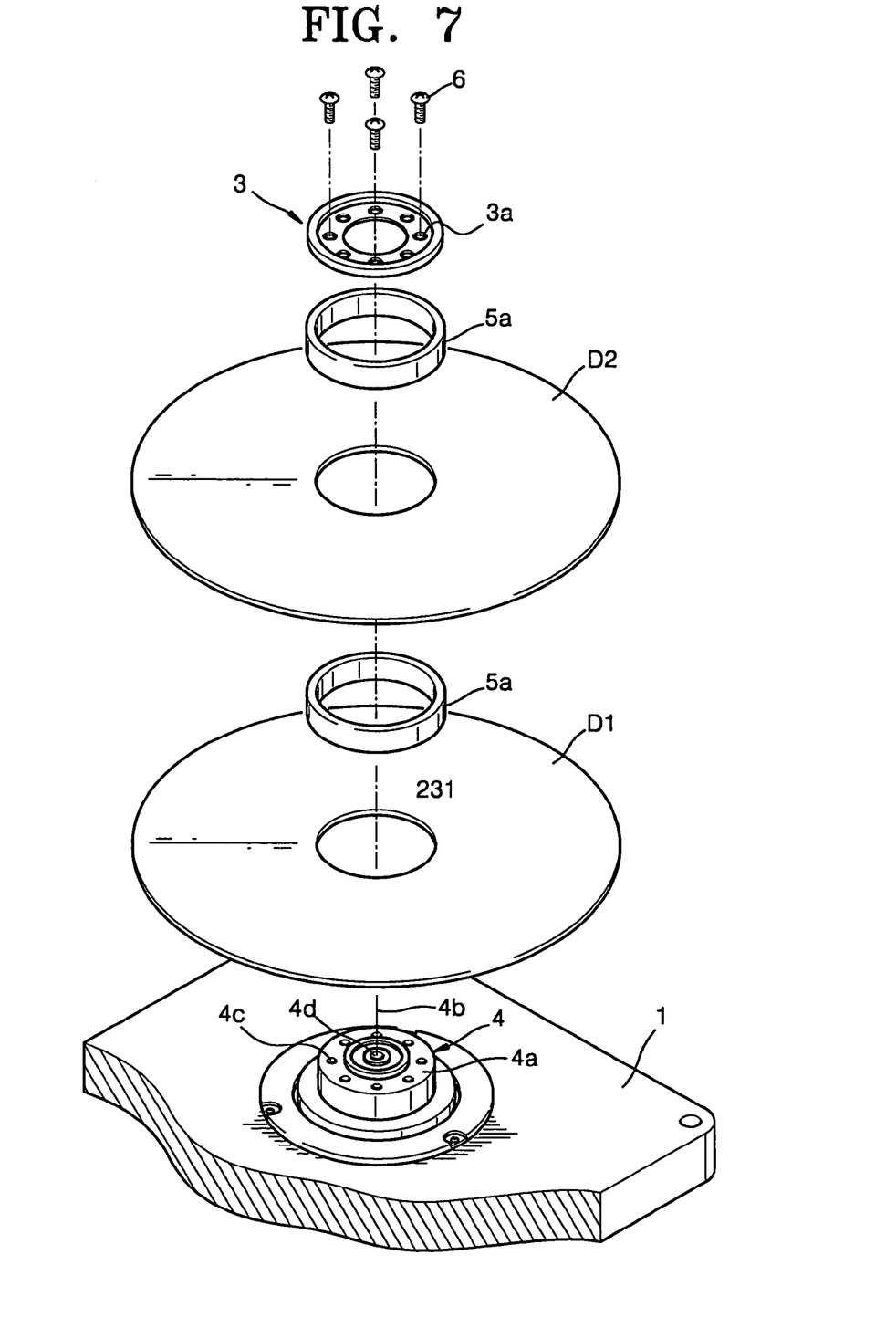
FIG. 7 is an exploded perspective view illustrating a hard disk drive having two hard disks.

FIG. 6 is a perspective view illustrating a pushing unit and a limiter. Referring to FIG. 6, a linear motor is installed on both sides of the second frame 170. Stators 232 and 242 are fixed in the second frame 170, and working pieces 231 and 241 are inserted in the stators 232 and 242, respectively. A push cap 233 that pushes the hard disk D, and a contact part 243 that contacts the outer circumference of the hard disk D, are installed on each end of the working pieces 231 and 241. In an embodiment, the push cap 233 and the contact part 243 are made of soft material so that the outer circumference of the hard disk D is not damaged. Also, as shown in FIG. 6, preferably, the push cap 233 and the contact part 243 are extended downwardly from ends of the working pieces 231 and 241 and then, are slightly extended in the working pieces 231 and 241. This is because, as shown in FIG. 7, in the case of a hard disc drive on which several pieces of hard disks are stacked, the push cap 233 or the limiter 240 does not interfere with upper hard disks when lower hard disks are balanced. The linear motor is generally well-known, and thus, descriptions thereof will be omitted. The pushing unit 230 and the limiter 240 alternately slide in the radial direction of the hard disk D, and thus, various modifications may be possible.

Preferably, the pushing unit 230 and the limiter 240 are installed to be capable of rotating centering on the rotation axis 4b of the spindle motor 4. This is because the pushing unit 230 has to be moved in an eccentricity position, and the limiter 240 has to be moved in an opposite direction to the pushing unit 230 after the eccentricity amount and eccentricity position of the hard disk D are detected. In the preset embodiment, the pushing unit 230 and the limiter 240 are installed on both ends of the second frame 170. Thus, when the second frame 170 is installed in the first frame 160, the second frame 170 is installed to be capable of rotating centering on the detection sensor 220. For this purpose, as shown in FIGS. 4 and 5, a driving motor 180 is installed on the first frame 160, and the second frame 170 is coupled with a rotation axis of the driving motor 180. In this case, the rotation axis of the driving motor 180 is coaxial with the center axis of the detection sensor 220 so that the pushing unit 230 and the limiter 240 are rotated centering on the detection sensor 220. In an embodiment, the pushing unit 230 and the limiter 240 are installed to be closer to the second frame 170 than the distance sensors 210a, 210b, and 210c so that the pushing unit 230 and the limiter 240 do not interfere with the distance sensors 210a, 210b, and 210c when they are rotated. Although not shown, the seating portion 110 may be rotated centering on the rotation axis 4b of the spindle motor 4.

Before the hard disk drive 10 is seated on the seating portion 110, the distance sensor 210, the pushing unit 230, and the limiter 240 move up, and after the hard disk drive 10 is seated on the seating portion 110, the distance sensor 210, the pushing unit 230, and the limiter 240 move down to be at the same height as the hard disk drive 10. Also, the hard disk drive 10 may include two or more hard disks D. When the hard disk drive 10 includes two or more hard disks D, as shown in FIG. 7, a first hard disk D1 is inserted on the hub 4a of the spindle motor 4, a first spacer 5a is put on the first hard disk D1, a second hard disk D2 is put on the first spacer 5a, a second spacer 5b is put on the second hard disk D2, and then, a clamp 3 is put on the second spacer 5b, and screws 6 are coupled with clamp holes 3a. In this case, each of the first hard disk D1 and the second hard disk D2 should be balanced. In order to do this, preferably, the distance sensor 210, the pushing unit 230, and the limiter 240 move up in a direction Z. For this purpose, as described above, the vertical frame 150 is coupled with the slider 140 so that the vertical frame 150 moves up along the direction Z. Although not shown, a rack gear is placed above and below the vertical frame 150, and a driving motor (not shown) having a pinion gear engaged with the rack gear is installed such that the vertical frame 150 can ascend in the direction Z. So, the first frame 160 coupled with the vertical frame 150 and the second frame 170 coupled with the first frame 160 ascend in the direction Z. Thus, the distance sensor 210, the pushing unit 230, and the limiter 240 ascend in the direction Z.

Alternatively, the seating portion 110 may ascend too. This can be achieved by various modifications in the gear that comprising the rack gear and the pinion gear.

Now, a hard disk balancing method for a hard disk drive will be described with reference to FIGS. 4 through 6 and FIGS. 8 and 9, which are plane views illustrating a hard disk balancing method for a hard disk drive shown in FIG. 4, according to an embodiment of the present invention. The diameter of the hollow H of the hard disk D is greater than that of the hub 4a by several $\mu$m to several tens of $\mu$m. However, for clarity, the diameter of the hollow H of the hard disk D is exaggerated in FIGS. 8 and 9.

First, the hard disk drive D on which the hard disk D is provisionally assembled is put on the seating portion 110. Here, the provisional-assembling refers to a state where the screws 6 for fixing the hard disk D are not completely tightened. In this state, if some force is applied to the hard disk D, the hard disk D can be easily moved.

Next, the rotation axis 4b of the spindle motor 4 is detected by driving the detection sensor 220, and the center axis of the detection sensor 220 is arranged coaxially with the rotation axis 4b of the spindle motor 4 by moving the columns 121 and 122 and the slider 140 in the directions X and Y, respectively (operation a1). As described previously, in this case, the seating portion 110 can be moved.

Figure 8:
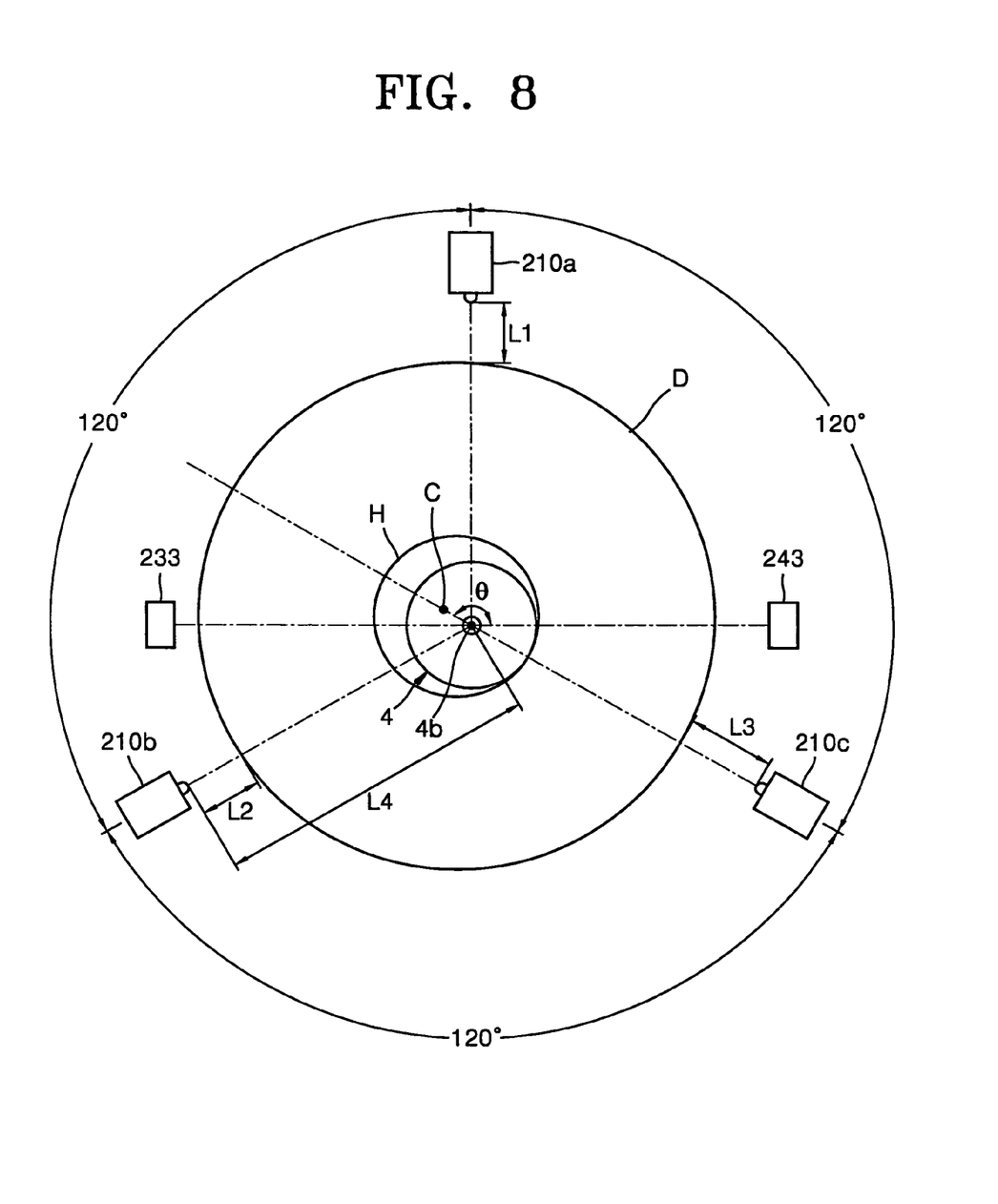
FIGS. 8 and 9 are plane views for illustrating a hard disk balancing method for the hard disk drive shown in FIG. 4, according to an embodiment of the present invention.
Figure 9:
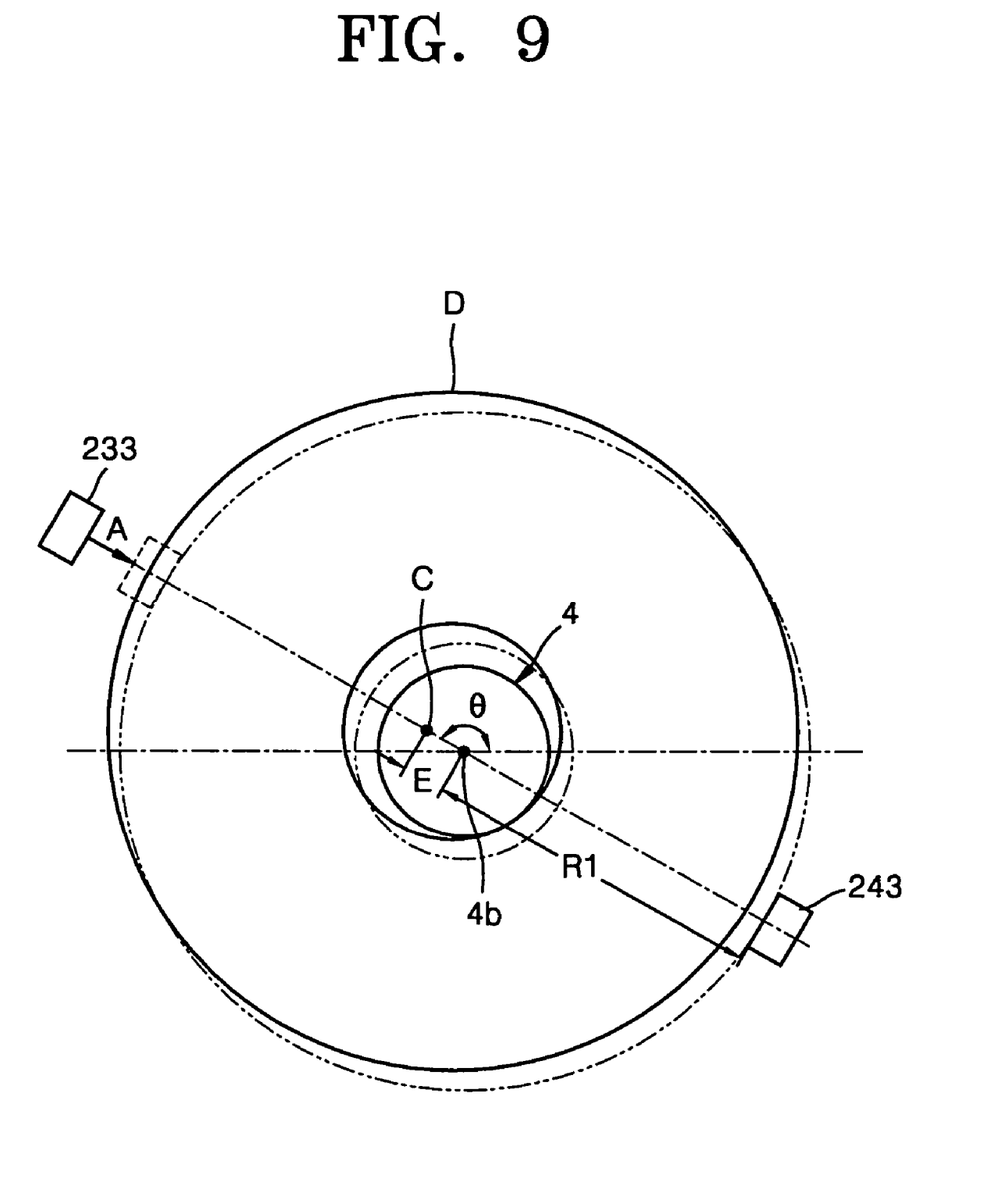

Next, the distance sensor 210, the pushing unit 230, and the limiter 240 are moved to the same height with the hard disk D by descending the vertical frame 150. Then, as shown in FIG. 8, each of the distance sensors 210a, 210b, and 210c is placed at an interval of 120° with respect to each other, while being separated from the rotation axis 4b of the spindle motor 4 by a distance L4 (operation a2). In this case, preferably, the push cap 233 and the contact part 243 are placed in a position where the hard disk D is in a maximum eccentric position, that is, the push cap 233 and the contact part 243 are at a distance greater than a distance (R1+R2−R3) calculated by adding a difference between a radius R2 of the hollow H and a radius R3 of the hub 4a to a radius R1 of the hard disk D from the rotation axis 4b of the spindle motor 4. This is because the pushing unit 230 and the limiter 240 do not interfere with the outer circumference of the hard disk D when they ascend.

Next, each of the distance sensors 210a, 210b, and 210c measures distances L1, L2, and L3 between the outer circumference of the hard disk D and themselves. Since the rotation axis 4b of the spindle motor 4 and the detection sensor 220 are coaxial, coordinates of the distance sensors 210a, 210b, and 210c with respect to the rotation axis 4b of the spindle motor 4 are the same as those of the distance sensors 210a, 210b, and 210c with respect to the detection sensor 220. Thus, coordinates of three points on the outer circumference of the hard disk D with respect to the rotation axis 4b of the spindle motor 4 can be known by the distances L1, L2, and L3 (operation a3). Also, a coordinate of the center C of the hard disk D can be calculated from these coordinates (operation a4).

The coordinate of the center C of the hard disk D centering on the rotation axis 4b of the spindle motor 4 is calculated by steps a1 through a4 (operation a).

If the coordinate of the center C of the hard disk D is calculated, an eccentricity amount E and an eccentricity position θ are calculated using the coordinate. So, a distance between the rotation axis 4b of the spindle motor 4 as an origin and the center C of the hard disk D represents the eccentricity amount E, and an angle by which the position of the center C of the hard disk D with respect to the origin is indicated represents the eccentricity position θ (operation b).

Next, the eccentricity is corrected (operation c). In this case, preferably, only when the eccentricity amount E is greater than a reference eccentricity amount, the step of correcting eccentricity which will be described later, is performed.

In order to correct the eccentricity, first, the pushing unit 230 has to be moved to the eccentricity position θ. For this purpose, the seating portion 110 on which the hard disk drive 10 is seated may be rotated, or the pushing unit 230 and the limiter 240 may be rotated. Here, the latter case will be described. The driving motor 150 rotates the second frame 170 so that the pushing unit 230 is placed in the eccentricity position θ (operation c1). Then, the limiter 240 is placed to face the pushing unit 230 (operation c3). If the pushing unit 230 is moved to the eccentricity position θ, the contact part 243 of the limiter 240 is moved to be separated from the rotation axis 4b of the spindle motor 4 by the radius R1 of the hard disk D (operation c2). In this state, the pushing unit 230 is driven in a direction A as indicated by the arrow in FIG. 9 such that the push cap 233 pushes the hard disk D toward the rotation axis 4b of the spindle motor 4. If the pushing unit 230 is excessively driven and the push cap 233 pushes the hard disk D toward the rotation axis 4b of the spindle motor 4 over the calculated eccentricity amount E, the outer circumference of the hard disk D contacts the opposite contact part 243 of the limiter 240 and thus is not pushed any more.

If two hard disks D are mounted in the hard disk drive 10, the vertical frame 150 ascends in the direction Z, and the distance sensor 210, the pushing unit 230, and the limiter 240 are at the same height with the outer circumference of a next hard disk D, and the above operations (a) through (c) are repeated. In this case, after the upper hard disk is first balanced, the lower hard disk may be balanced. However, preferably, the hard disks are sequentially balanced from the lower one.

The eccentricity amount is calculated again by performing the above-described operation (b) after correcting eccentricity, and when the eccentricity amount is greater than the reference eccentricity amount, the operation (c) may be performed again. This procedure may be repeated until the eccentricity amount is smaller than the reference eccentricity amount.

Lastly, if the screws 6 for fixing the hard disk D are completely tightened, the hard disk D is fixed in the spindle motor 4 without eccentricity.

As described above, the hard disk balancing apparatus and method for a hard disk drive according to the present invention has the following advantages. First, since the center of a disk is coaxial with a rotation axis of a spindle motor, vibration caused by eccentricity and a tracking error which may occur in a magnetic head can be prevented. Second, unlike in a conventional hard disk balancing method for a hard disk drive, the eccentricity amount of a hard disk does not need to be considered in tracking control of the magnetic head, and thus, a burden on the control of the magnetic head is reduced. Third, due to the eccentricity amount, load on a bearing used in the spindle motor is reduced, and thus, the life span of the bearing can be lengthened.

While this invention has been particularly shown and described with reference to a few embodiments thereof, it will be understood by those skilled in the art that various changes in form and details may be made therein without departing from the spirit and scope of the invention as defined by the appended claims and equivalents thereof.

What is claimed is:

1. A hard disk balancing method for a hard disk drive, the method comprising:
   (a) detecting coordinates of at least three points on an outer circumference of the hard disk with respect to a rotation axis of a spindle motor for rotating the hard disk as an origin, and calculating a coordinate of a center point of the hard disk;
   (b) calculating an eccentricity amount and an eccentricity position of the hard disk based on the origin from the coordinate of the center point of the hard disk; and
   (c) pushing the hard disk toward the origin in the eccentricity position according to the eccentricity amount to remove an eccentricity of the hard disk.

2. The method of claim 1, wherein (c) is performed only if the eccentricity amount calculated in (b) is compared with a reference eccentricity amount, and the eccentricity amount is greater than the reference eccentricity amount.

3. The method of claim 1, further comprising:
   (d) performing (c) again only if the eccentricity amount is greater than a reference eccentricity amount by further performing (b) after performing (c).

4. The method of claim 1, wherein (a) comprises:
   (a1) detecting the rotation axis of the spindle motor as the origin;
   (a2) placing at least three distance sensors for each detecting a distance to one point on the outer circumference of the hard disk to be farther than the outer circumference of the hard disk from the origin;
   (a3) calculating coordinates of at least three points on the outer circumference of the hard disk with respect to the origin from a distance between the origin and the at least three distance sensors and a distance between the at least three distance sensors and the outer circumference of the hard disk; and
   (a4) calculating a coordinate of the center point of the hard disk with respect to the origin from the coordinates of at least three points on the outer circumference of the hard disk.

5. The method of claim 4, wherein the at least three distance sensors are placed at the same distance from the origin.

6. The method of claim 1, wherein (c) comprises:
   (c1) moving a pushing unit for pushing the hard disk in the eccentricity position; and
   (c2) pushing the hard disk toward the origin according to the eccentricity amount.

7. The method of claim 6, wherein (c) further comprises:
   (c3) placing a limiter to contact the outer circumference of the hard disk while being separated from the detection sensor by the radius of the hard disk and to prevent the hard disk from being excessively pushed by the pushing unit, to face the pushing unit.

8. A hard disk balancing apparatus for a hard disk drive, the apparatus comprising:
an eccentricity detection unit to detect an eccentricity amount and an eccentricity position of the hard disk with respect to a rotation axis of a spindle motor for rotating the hard disk as an origin; and
a pushing unit to push a circumference of the hard disk in the eccentricity position and to move the hard disk on the rotation axis of the spindle motor according to the eccentricity amount,
wherein the eccentricity detection unit comprises:
a detection sensor to detect the rotation axis of the spindle motor, wherein the detection sensor is placed coaxially with the rotation axis of the spindle motor; and
at least three distance sensors, which are separated from the detection sensor to be at least farther than a radius of the hard disk, to each measure a distance to one point on the outer circumference of the hard disk.

9. The apparatus of claim 8, wherein the at least three distance sensors are installed on a concentric circle centering on the detection sensor.

10. The apparatus of claim 9, wherein the at least three distance sensors are separated from the detection sensor by the same distance.

11. The apparatus of claim 8, wherein the pushing unit is installed to be capable of moving in a radial direction of the hard disk.

12. The apparatus of claim 8, wherein the pushing unit is installed to be capable of rotating centering on the detection sensor.

13. The apparatus of claim 12, wherein the pushing unit is installed to be closer to the detection sensor than the at least three distance sensors so that the pushing unit does not interfere with the at least three distance sensors when the pushing unit is rotated.

14. The apparatus of claim 8, further comprising a seating portion on which the hard disk drive is seated, wherein the seating portion is installed to be capable of rotating centering on the rotation axis of the spindle motor.

15. The apparatus of claim 8, wherein the at least three distance sensors and the pushing unit are installed to be capable of ascending and descending in a direction of the rotation axis of the spindle motor.

16. The apparatus of claim 8, further comprising a seating portion on which the hard disk drive is seated, wherein the seating portion is installed to be capable of ascending and descending in a direction of the rotation axis of the spindle motor.

17. The apparatus of claim 8, wherein the at least three distance sensors and the pushing unit are installed to be capable of moving in a horizontal direction.

18. The apparatus of claim 8, further comprising a seating portion on which the hard disk drive is seated, wherein the seating portion is installed to be capable of moving in a horizontal direction.

19. The apparatus of claim 8, further comprising a limiter to contact the outer circumference of the hard disk while being separated from the detection sensor by the radius of the hard disk and to prevent the hard disk from being excessively pushed by the pushing unit.

20. The apparatus of claim 19, wherein the limiter is installed to face the pushing unit.

21. The apparatus of claim 19, wherein the limiter is installed to be capable of moving in the radial direction of the hard disk.

22. The apparatus of claim 19, wherein the pushing unit and the limiter are installed to be capable of rotating centering on the detection sensor.

23. The apparatus of claim 22, wherein the pushing unit and the limiter are installed to be closer to the detection sensor than the at least three distance sensors so that the pushing unit and the limiter do not interfere with the at least three distance sensors when they are rotated.

24. The apparatus of claim 19, further comprising a seating portion on which the hard disk drive is seated, wherein the seating portion is installed to be capable of rotating centering on the rotation axis of the spindle motor.

25. The apparatus of claim 19, wherein the at least three distance sensors, the pushing unit, and the limiter are installed to be capable of ascending and descending in the direction of the rotation axis of the spindle motor.

26. The apparatus of claim 19, further comprising a seating portion on which the hard disk drive is seated, wherein the seating portion is installed to be capable of ascending and descending in the direction of the rotation shaft of the spindle motor.

27. The apparatus of claim 26,
wherein before the hard disk drive is seated on the seating portion, the distance sensor, the pushing unit, and the limiter move up, and
wherein after the hard disk drive is seated on the seating portion, the distance sensor, the pushing unit, and the limiter move down to a same height as the hard disk drive.

28. The apparatus of claim 19, wherein the at least three distance sensors, the pushing unit, and the limiter are installed to be capable of moving in a horizontal direction.

29. The apparatus of claim 19, further comprising a seating portion on which the hard disk drive is seated, wherein the seating portion is installed to be capable of moving in a horizontal direction.

30. The apparatus of claim 8, further comprising:
an index in the rotation axis of the spindle motor to indicate a rotation center of the spindle motor,
wherein, the detection sensor, by detecting the index, detects the rotation center of the spindle motor exactly.

31. The apparatus of claim 8, wherein the at least three distance sensors are installed on a concentric circle centering on the rotation axis of the spindle motor and are installed at a same distance from the rotation axis of the spindle motor.

32. The apparatus of claim 31, wherein the at least three distance sensors are installed at an interval of 120 degrees from each other.

* * * * *